United States Patent
Takenaka et al.

(10) Patent No.: US 6,356,825 B1
(45) Date of Patent: Mar. 12, 2002

(54) AIR-CONDITIONING SYSTEM FOR AUTOMOBILES AND ITS CONTROL METHOD

(75) Inventors: Kenji Takenaka; Masahiro Kawaguchi; Masanori Sonobe, all of Kariya (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

(21) Appl. No.: 09/448,387

(22) Filed: Nov. 23, 1999

(30) Foreign Application Priority Data

Nov. 24, 1998 (JP) .............................. 10-332322

(51) Int. Cl.$^7$ .......................... F04B 49/00; F04B 27/08
(52) U.S. Cl. ............................................ 701/36; 62/133
(58) Field of Search ................................ 701/36; 62/133

(56) References Cited

U.S. PATENT DOCUMENTS

| | | | | |
|---|---|---|---|---|
| 4,135,368 A | * | 1/1979 | Mohr et al. ................... | 62/133 |
| 4,688,530 A | * | 8/1987 | Nishikawa et al. ........ | 123/198 R |
| 4,823,555 A | * | 4/1989 | Ohkumo ...................... | 62/133 |
| 5,050,395 A | * | 9/1991 | Berger ......................... | 62/133 |
| 5,117,643 A | * | 6/1992 | Sakurai et al. ............... | 62/133 |
| 5,546,755 A | * | 8/1996 | Krieger ........................ | 62/133 |
| 5,713,725 A | * | 2/1998 | Kawaguchi et al. ......... | 417/222.2 |
| 5,761,917 A | * | 6/1998 | Corcoran et al. ............ | 62/133 |

* cited by examiner

Primary Examiner—Richard M. Camby
Assistant Examiner—E. Gibson
(74) Attorney, Agent, or Firm—Morgan & Finnegan, LLP

(57) ABSTRACT

An automobile moves at a traveling speed in accordance with the position of an acceleration pedal. A compressor is driven by the engine of the automobile. The discharge displacement of the compressor is adjusted by an external control procedure. When the position of the acceleration pedal reaches a determining value, or above at which it is determined that engine power is needed for accelerating the vehicle, the compressor is controlled such that the discharge displacement decreases. The determining value is selected by a controller in relation to the traveling speed detected by a speed sensor. The determining value increases as the speed increases.

12 Claims, 5 Drawing Sheets

AIR-CONDITIONING SYSTEM FOR AUTOMOBILES AND ITS CONTROL METHOD

BACKGROUND OF THE INVENTION

The present invention relates to air-conditioning systems for automobiles and methods for controlling these systems.

A typical air-conditioning system for automobiles includes a compressor for compressing refrigerant gas. The compressor is activated by the force transmitted from an automobile engine when the temperature in the passenger compartment exceeds a predetermined value. If the compartment temperature is not greater than the predetermined value, the compressor is not activated. An electromagnetic clutch is arranged in a power transmitting path for connecting the engine with the compressor. The electromagnetic clutch is selectively excited or de-excited in relation to the compartment temperature such that the compressor is engaged or disengaged from the engine accordingly.

Activation of the compressor applies load to the engine. Thus, when the engine power is transmitted to the compressor, the engine does not respond quickly to depression, or operation, of the automobile's accelerator. Low-power engines are particularly affected by the load applied by the compressor. The response to the operation of the accelerator is significantly delayed for low-power engines.

To solve this problem, the following control procedure is executed when the accelerator is operated. When the accelerator is operated such that the throttle valve opens wider than a predetermined position, the clutch is disengaged in order to disconnect the compressor from the engine. The disengagement of the compressor from the engine removes the load applied to the engine by the compressor when the automobile is accelerated. The engine power is thus maximally transmitted to the automobile's driving wheels.

However, since the disengagement of the clutch stops the compressor, the automobile compartment is no longer air-conditioned. Thus, the automobile driver must choose between acceleration performance and air-conditioning. In other words, the automobile cannot be smoothly accelerated while the passenger compartment is being air-conditioned. In addition, once the clutch is disengaged to enable smooth acceleration, an impact is caused when the clutch is re-engaged after completing the acceleration.

Furthermore, the predetermined throttle valve position for determining whether to disengage the clutch is selected according to traveling speed that is assumed to correspond to the predetermined throttle valve position. Specifically, as long as the traveling speed remains lower than the assumed speed, the clutch remains engaged. However, when the vehicle speed reaches the assumed speed, the throttle valve opening reaches the predetermined position, and the compressor is disengaged from the engine. That is, since the predetermined throttle valve position is constant regardless of the traveling speed, the clutch is disengaged if the accelerator is operated even by a small amount as long as the speed is greater than the assumed speed. If the clutch is disengaged, the compartment is no longer air-conditioned. Furthermore, if the depression amount of the accelerator varies in the vicinity of the reference value, the clutch is engaged and disengaged repeatedly.

SUMMARY OF THE INVENTION

Accordingly, it is an objective of the present invention to provide an air-conditioning system for automobiles and a method for controlling this system that is capable of continuing air-conditioning operation while allowing the vehicle to accelerate smoothly without hindrance.

To achieve the foregoing and other objective and in accordance with the purpose of the present invention, an air conditioning apparatus having a first sensor for detecting the position of an accelerator and a compressor. The accelerator position is defined by the degree of the depression of the accelerator. The compressor is driven by an engine of a vehicle. A displacement of the compressor is varied by an external controller. The apparatus includes a second sensor for detecting the vehicle speed, computing means and control means. The computing means computes a reference value of the accelerator position based on the vehicle speed. The reference value is used to determine that load applied to the engine by the compressor is to be decreased. The control means controls the compressor so as to decrease its displacement based on the reference value.

In another aspect of the present invention, a method for controlling air conditioning apparatus having a compressor actuated by an engine of a vehicle is provided. A displacement of the compressor is varied by an external controller. The method includes steps of: determining a driver's attempt to decreasing load applied to the engine by the compressor based on the vehicle speed and a position of the accelerator, decreasing the displacement of the compressor after the determining step.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENT

A first embodiment of an air-conditioning system for automobiles according to the present invention will now be described. A swash plate type variable displacement compressor, which is used in the first embodiment, will be described first, followed by a description of the air-conditioning system and its control structure.

Figure 1:
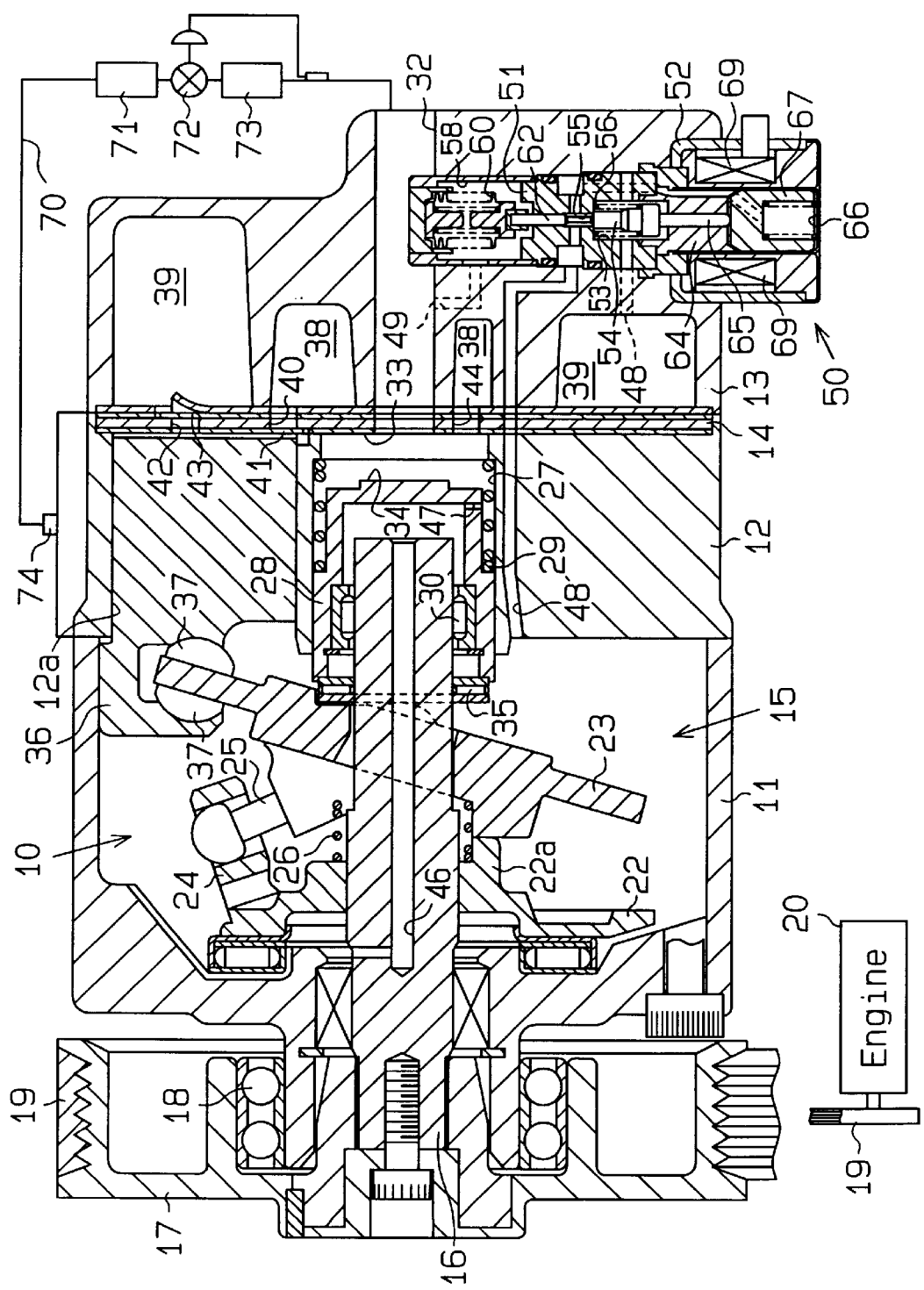
FIG. 1 is a cross-sectional view showing a compressor having a swash plate inclined at a maximum angle according to the present invention.

As shown in FIG. 1, a front housing 11 is connected with the front end of the cylinder block 12. A rear housing 13 is connected with the rear end of the cylinder block 12 by means of a valve plate 14. The front housing 11 and the cylinder block 12 define a crank chamber 15. A drive shaft 16 is rotationally supported by the front housing 11 and the cylinder block 12 and extends through the crank chamber 15. The drive shaft 16 projects from the front end of the front housing 11. A pulley 17 is arranged at the front end of the front housing 11 and supported by the projecting end of the drive shaft 16 through a bearing 18. The pulley 17 rotates integrally with the drive shaft 16. A belt 19 is wound around the pulley 17 to couple the compressor with an automobile engine 20, which serves as an external drive source. Since no electromagnetic clutch is located between the compressor and the engine 20 as shown in FIG. 1, this compressor is called a clutchless type compressor.

A lug plate 22 is secured to the drive shaft 16 in the crank chamber 15. A swash plate 23 is supported by the drive shaft 16 such that the swash plate 23 inclines with respect to the shaft 16 and axially slides along the shaft 16. The swash plate 23 is engaged with the lug plate 22 by a known hinge mechanism 10. The hinge mechanism 10 includes a pair of support arms 24 (only one is shown in FIG. 1) and a pair of guide pins 25 (only one is shown in FIG. 1). The arms 24 project from the rear side of the lug plate 22, while the pins 25 project from the front side of the swash plate 23. Each pin 25 includes a spherical distal end, which is inserted in a guide hole defined in the associated arm 24. In this manner, the arms 24 are connected with the associated pins 25. The hinge mechanism 10 enables the swash plate 23 to incline with respect to the drive shaft 16 and rotate integrally with the shaft 16.

A restricting projection 22a is formed on the rear side of the lug plate 22. As shown in FIG. 1, the projection 22a abuts against a portion of the swash plate 23 to restrict the maximum tilt angle of the swash plate 23. A coil spring 26 is arranged between the lug plate 22 and the swash plate 23 and around the drive shaft 16. The coil spring 26 urges the swash plate 23 toward the cylinder block 12. As the swash plate 23 moves closer to the cylinder block 12, the inclination angle of the swash plate 23 becomes smaller.

A shutter chamber 27 is defined in the center of the cylinder block 12, while a suction passage 32 extends in the center of the rear housing 13. The suction passage 32 opens to the shutter chamber 27. The shutter chamber 27 has a positioning surface 33 formed along the opening of the passage 32. The shutter chamber 27 receives a cylindrical sleeve 28 such that the sleeve 28 is slidable and rotatable. The sleeve 28 is urged by a coil spring 29 toward the swash plate 23. The rear end of the drive shaft 16 is received by the sleeve 28 and supported by a radial bearing 30. The sleeve 28 includes a shutter surface 34 formed at the rear end of the sleeve 28. The shutter surface 34 contacts and separates from the positioning surface 33 when the sleeve 28 moves. When the shutter surface 34 abuts against the positioning surface 33, the suction passage 32 is sealed from the shutter chamber 27.

A thrust bearing 35 is arranged between the swash plate 23 and the sleeve 28. The thrust bearing 35 is slidable along the drive shaft 16. The coil spring 26 urges the swash plate 23 toward the thrust bearing 35 such that the swash plate 23 remains in contact with the bearing 35. Meanwhile, the coil spring 29 urges the sleeve 28 toward the thrust bearing 35 such that the sleeve 28 remains in contact with the bearing 35. When the swash plate 23 inclines with respect to the drive shaft 16 and slides toward the cylinder block 12, the sleeve 28 moves toward the positioning surface 33 against the force of the coil spring 29. The shutter surface 34 eventually abuts against the positioning surface 33. This abutment prevents the swash plate 23 from inclining further, thus determining its minimum tilt angle. The minimum tilt angle of the swash plate 23 is set slightly larger than zero degrees.

A plurality of cylinder bores 12a (only one is shown in FIG. 1) are defined in the cylinder block 12. The bores 12a are arranged along a circle centered on the axis of the drive shaft 16 and spaced from one another by equal angular intervals. Each cylinder bore 12a accommodates a single-headed piston 36. The pistons 36 reciprocate in the associated cylinder bores 12a. Each piston 36 is operably connected with the swash plate 23 by a pair of shoes 37. The rotation of the swash plate 23 is transmitted to the pistons 36 by the shoes 37 and converted to linear reciprocation of the pistons 36. The stroke of each piston 36 varies as a function of the inclination angle of the swash plate 23. The compressor's discharge displacement is adjusted accordingly.

The rear housing 13 includes a substantially annular suction chamber 38 and a substantially annular discharge chamber 39. The discharge chamber 39 extends around the suction chamber 38. The suction chamber 38 communicates with the shutter chamber 27 through a communication hole 44 extending through the valve plate 14. The valve plate 14 includes a plurality of suction ports 40 and a plurality of suction valves 41. Each suction port 40 corresponds to one cylinder bore 12a, and each suction valve 41 corresponds to one suction port 40. The suction valves 41 selectively open and close the associated suction ports 40. The valve plate 14 also includes a plurality of discharge ports 42 and a plurality of discharge valves 43. While each discharge port 42 corresponds to one cylinder bore 12a, each discharge valve 43 corresponds to one discharge port 42. The discharge valves 41 selectively open and close the associated discharge ports 40.

Refrigerant gas is supplied to the suction chamber 38 from the exterior of the compressor. When each piston 36 moves from the top dead center toward the bottom dead center in the associated cylinder bore 12a, the gas in the suction chamber 38 is drawn into the cylinder bore 12a through the associated suction port 40, which is opened by the suction valve 41. When the piston 36 moves from the bottom dead center toward the top dead center in the associated cylinder bore 12a, the gas in the cylinder bore 12a is discharged to the discharge chamber 39 through the associated discharge port 42, which is opened by the discharge valve 43. The suction pressure acting when the gas in the suction chamber 38 is drawn into each cylinder bore 12a is not equal to the discharge pressure acting when the gas in the cylinder bore 12a is discharged to the discharge chamber 39. In this compressor, a zone in which the suction pressure acts is defined as a suction pressure zone, and a zone in which the discharge pressure acts is defined as a discharge pressure zone. The discharge chamber 39 defines the discharge pressure zone in the compressor. The suction passage 32, the shutter chamber 27, the communication hole 44, and the suction chamber 38 define the suction pressure (Ps) zone in the compressor of the illustrated air-conditioning system.

A bleeding passage 46 extends axially in the drive shaft 16. The bleeding passage 46 communicates the crank chamber 15 with the interior of the sleeve 28. A communication hole 47 extends through a wall of the sleeve 28. The communication hole 47 serves as a restriction for communicating the interior of the sleeve 28 with the shutter chamber 27, which is a part of the suction pressure zone. The bleeding passage 46, the communication hole 44, and the shutter chamber 27 define a bleeding path in the compressor. A supply passage 48 extends in the cylinder block 12 and the rear housing 13 and communicates the discharge chamber 39 with the crank chamber 15. A displacement control valve 50 is provided in the supply passage 48. A pressure line 49 extends in the rear housing 13 for connecting the suction passage 32 with the valve 50.

The control valve 50 will hereafter be described with reference to FIGS. 1 and 2.

Figure 2:
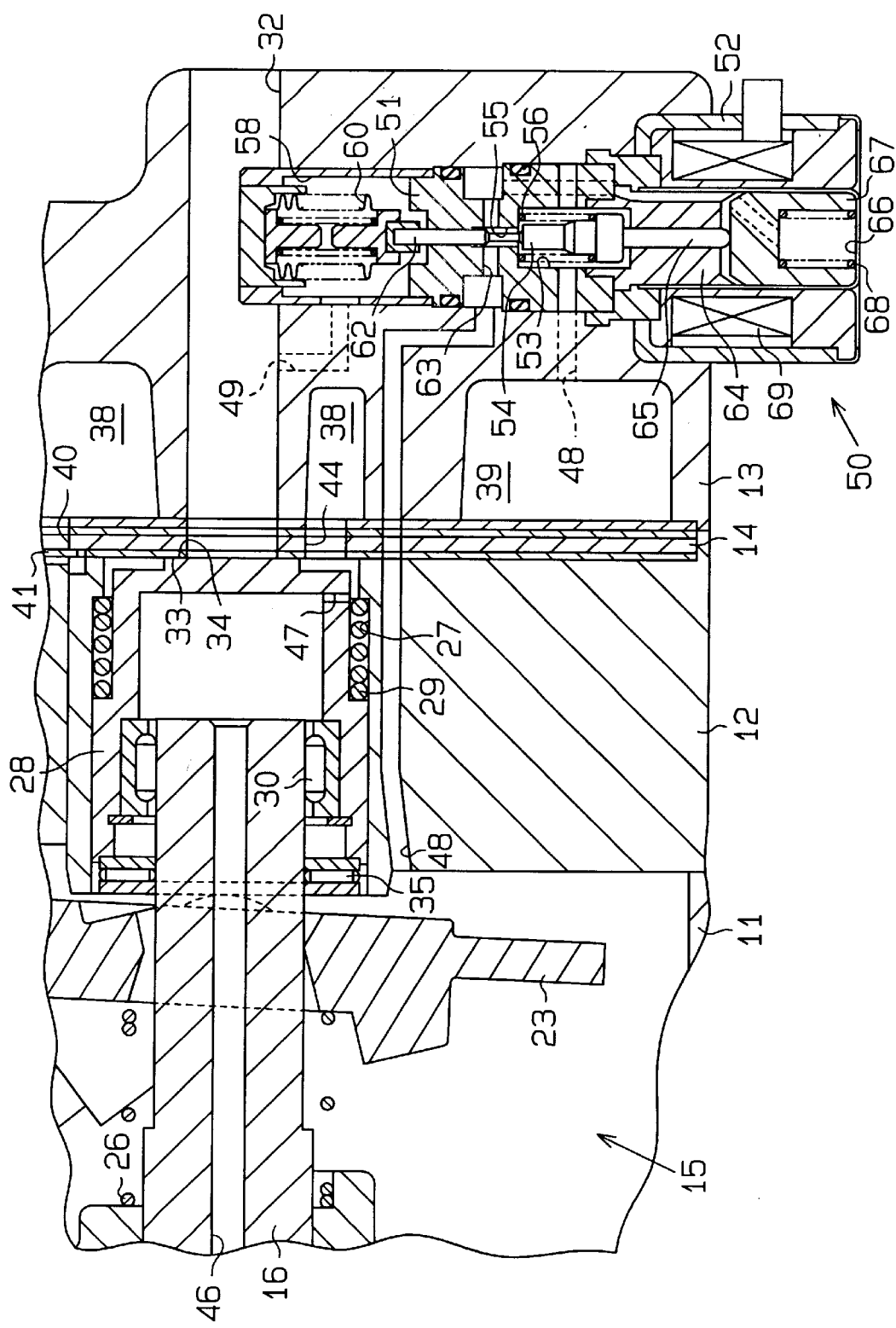
FIG. 2 is an enlarged cross-sectional view showing a portion of the compressor of FIG. 1 with the swash plate inclined at a minimum angle.

As shown in FIG. 2, the valve 50 includes a housing 51, a solenoid 52, and a valve chamber 53. The housing 51 is arranged in an upper portion of the valve 50, while the solenoid is arranged in a lower portion of the valve 50. The valve chamber 53 is provided between the housing 51 and the solenoid 52.

A port 63 is arranged above the valve chamber 53 and extends radially with respect to the housing 51. A valve hole 55 is formed in the center of the valve housing 51 to communicate the valve chamber 53 with the port 63. The valve chamber 53 communicates with the discharge chamber 39 through an upstream part of the supply passage 48, while the port 63 communicates with the crank chamber 15 through a downstream part of the supply passage 48. Specifically, the valve chamber 53, the valve hole 55, and the port 63 form a part of the supply passage 48. The valve chamber 53 accommodates a valve body 54 and a valve spring 56. The valve body 54 moves toward and separates from the valve hole 55. The valve spring 56 urges the valve body 54 to separate from the valve hole 55.

A pressure chamber 58 is defined in an upper portion of the valve housing 51. The pressure chamber 58 communicates with the suction passage 32 through the pressure line 49. The pressure chamber 58 is provided with a bellows 60. The housing 51 includes a wall separating the pressure chamber 58 from the valve chamber 53. A rod 62 extends through the wall and is axially slidable. The rod 62 connects the valve body 54 with the bellows 60. The lower end of the rod 62 is arranged in the valve hole 55 and has a relatively small diameter to define a passage through which the refrigerant gas in the valve hole 55 flows.

The solenoid 52 includes a fixed iron core 64 and a solenoid chamber 66. The iron core 64 extends immediately below the valve chamber 53 and defines an end of the solenoid chamber 66. The solenoid chamber 66 receives an iron plunger 67, which is shaped like a cup. The plunger 67 reciprocates axially in the solenoid chamber 66. The solenoid chamber 66 accommodates a plunger spring 68 urging the plunger 67 in the upward direction of FIG. 2. The urging force of the plunger spring 68 is smaller than the urging force of the valve spring 56. A solenoid rod 65 extends through the fixed iron core 64 such that the rod 65 is axially slidable with respect to the core 64. The solenoid rod 65 has one end integrally connected with the valve body 54 and another opposite end. The solenoid rod 65 is urged in an axial direction by the valve spring 56 and thus abuts against the plunger 67. In this manner, the solenoid rod 65 holds the plunger 67 and the valve body 54 such that the rod 65, the plunger 67, and the valve body 54 act as one body. A solenoid coil 69 is wound around the outer sides of the fixed core 64 and the plunger 67.

Figure 3:
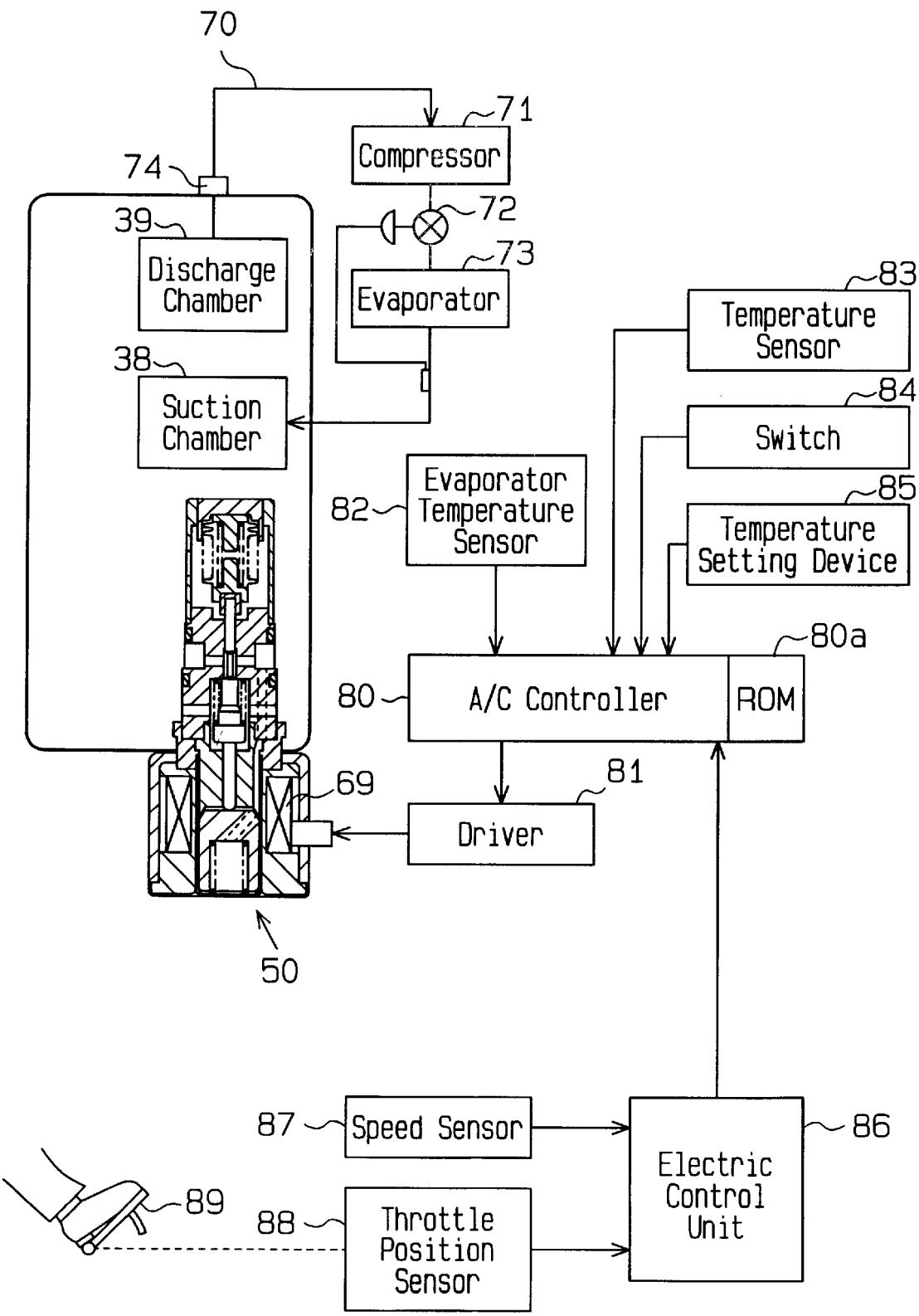
FIG. 3 is a block diagram showing a control structure of an air-conditioning system for automobiles according to the present invention.

As shown in FIG. 3, a driver 81 connects the solenoid coil 69 with an A/C controller 80. The air-conditioning system is provided with a refrigeration circuit, which is defined by the compressor and an external cooling circuit 70. The external cooling circuit 70 includes a condenser 71, an expansion valve 72, and an evaporator 73. The condenser 71 has an inlet connected with a discharge flange 74 (shown in FIG. 1) for receiving refrigerant gas discharged from the discharge chamber 39. The evaporator 73 has an outlet connected with the suction passage 32 for sending refrigerant gas to the suction chamber 38. The opening of the valve 72 is automatically adjusted as a function of the temperature of the evaporator 73.

The air-conditioning system also includes an electronic control structure including the A/C controller 80. The A/C controller 80 incorporates a central processing unit (CPU), a read only memory (ROM) 80a, a random access memory (RAM), and input and output interfaces. The ROM 80a stores various control programs, for controlling the air-conditioning system, and initial information and data required for executing the programs.

A control valve 50 is connected with the controller 80 by means of the driver 81. The controller 80 is connected with an evaporator temperature sensor 82, a compartment temperature sensor 83, a switch 84 for activating and de-activating the air-conditioning system, a compartment temperature setting device 85, a traveling speed sensor 87, and a throttle position sensor 88. The speed sensor 87 detects the automobile's traveling speed V by means of an electronic control unit (ECU) 86 provided in the engine. The throttle position sensor 88 detects the position of the engine's throttle valve. Since the position of the throttle valve varies in relation to the position of an acceleration pedal 89, the sensor 88 of the present invention detects the position of the acceleration pedal 89 as indicating the throttle position.

Figure 5:
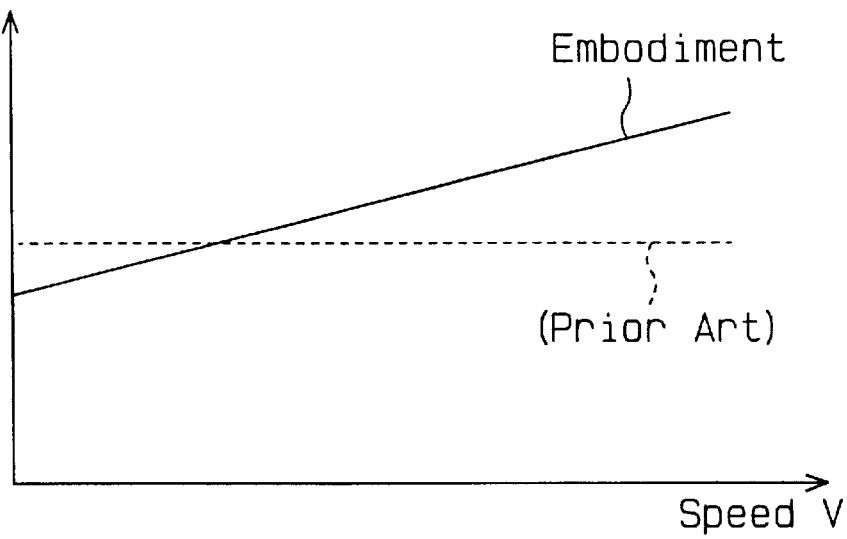
FIG. 5 is a graph showing the relationship between the traveling speed of the automobile and a reference value of the accelerator operation amount according to the present invention.

The ROM 80a stores map data that fixes the relationship between a reference value D, representing the position the acceleration pedal 89, with respect to the traveling speed V (hereafter referred to as the "reference value computing map"). FIG. 5 is a graph showing this map, or the relationship between the reference value D, which represents the position of the acceleration pedal 89, and the traveling speed V. As shown in FIG. 5, the reference value D increases greater as the speed V increases. The broken line of FIG. 5 indicates the relationship between the reference value D and the traveling speed V of the prior art. In the prior art, the reference value D remains constant regardless of the speed V.

The controller 80 receives information from various external devices. The information includes the evaporator temperature detected by the sensor 82, the compartment temperature detected by the sensor 83, an ON/OFF state of the switch 84, a target temperature set with the temperature setting device 85, the traveling speed V, and the accelerator position ACCP. In accordance with this information, the controller 80 first obtains the appropriate current level to be supplied to the solenoid coil 69. The controller 80 then supplies a current corresponding to the resulting level to the solenoid coil 69 through the driver 81. In this manner, a target suction pressure Pset of the control valve 50 is externally adjusted by the controller 80.

The operation of the above air-conditioning system will hereafter be described. Specifically, normal operation, when the automobile is not being accelerated, will first be described, followed by a description of the operation for suppressing the system's cooling performance when the automobile is being accelerated.

If the switch 84 is turned on and the temperature of the passenger compartment detected by the sensor 83 is greater than the target temperature set with the setting device 85, the passenger compartment is air-conditioned such that the passenger compartment temperature falls to the target temperature. The A/C controller 80 thus supplies a predetermined level of current to the solenoid coil 69 of the control valve 50. An electromagnetic attracting force is then produced between the core 64 and the plunger 67 in accordance with the current supply. The force acts to move the valve body 54 against the urging force applied by the valve spring 56. Meanwhile, the bellows 60 produces a force acting to move the valve body 54 axially in a direction to open the valve hole 55 downwardly by means of the rod 62. The equilibrium position of the valve body 54 is thus determined by the force of the solenoid 52, the force of the valve spring 56, and the force of the bellows 60. This position of the valve body 54 determines target suction pressure Pset, or the opening, of the control valve 50. Thus, the target suction pressure Pset is varied by altering the force of the solenoid 52 by means of an external current supply control.

When the urging force of the solenoid 52 is constant, the target suction pressure Pset is also constant. However, even in this state, the bellows 60 moves in accordance with variation in the suction pressure Ps, which is applied to the pressure chamber 58 from the suction passage 32 through the pressure line 49. The movement of the bellows 60 is transmitted to the valve body 54 by means of the rod 62. Accordingly, the position of the valve body 54 in the valve chamber 53 is varied by the suction pressure Ps. In other words, the opening of the control valve 50, or the supply passage 48, is determined by the equilibrium position of the valve body 54, which is affected by the force of the solenoid 52, the force of the valve spring 56, and the force of the bellows 60. In this sense, the control valve 50 is automatically operated. The pressure in the crank chamber 15 (crank pressure Pc) is adjusted as a function of the opening of the control valve 50. As a result, the inclination of the swash plate 23 and the discharge displacement (or piston stroke) of the compressor are adjusted as required for cooling the passenger compartment to the target temperature.

If the detected passenger compartment temperature is significantly higher than the target temperature, or the difference between the detected passenger compartment temperature and the target temperature is relatively great, the passenger compartment cannot be cooled to the target temperature simply by adjusting the opening of the control valve 50 based on the force of the bellows 60. In this case, the controller 80 lowers the target suction pressure Pset of the control valve 50 such that the difference between the target suction pressure Pset and the current suction pressure Ps increases. The discharge displacement of the compressor is thus increased (or the compressor's cooling performance is increased). Specifically, as the difference between the detected passenger compartment temperature and the target temperature becomes greater, the controller 80 supplies a greater current to the solenoid coil 69. The greater current supply produces a greater electromagnetic attractive force between the core 64 and the plunger 67. Thus, the force acting to move the valve body 54 toward its closed position is increased. In this state, if the suction pressure Ps is relatively high, the opening of the control valve 50 is maximally restricted or closed. The restricted opening of the valve 50 greatly reduces the amount of refrigerant gas sent from the discharge chamber 39 to the crank chamber 15 via the supply passage 48. Meanwhile, the refrigerant gas in the crank chamber 15 flows to the suction chamber 38 via the bleeding passage 46 and the communication hole 47. As a result, the crank pressure Pc decreases (or the compressor's discharge displacement increases) due to the restricted opening of the control valve 50. In this manner, the cooling performance of the air-conditioning system is increased such that the passenger compartment can be cooled to the target temperature. Once the cooling performance of the system is increased, the suction pressure Ps gradually decreases toward the target suction pressure Pset. Accordingly, the inclination of the swash plate 23 (the discharge displacement of the compressor) is automatically adjusted such that the cooling performance of the air-conditioning system corresponds to the difference between the detected passenger compartment temperature and the target temperature.

However, if the difference between the detected passenger compartment temperature and the target temperature is relatively small, the level of the current supplied to the solenoid coil 69 by the controller 80 becomes smaller as the passenger compartment temperature becomes lower. The electromagnetic attractive force between the core 64 and the plunger 67 thus becomes weaker such that the force urging the valve body 54 toward its closed position decreases. That is, the controller 80 raises the target suction pressure Pset when the passenger compartment temperature is relatively low. In this case, as long as the suction pressure Ps remains relatively low due to the smaller difference between the passenger compartment temperature and the target temperature, the opening of the control valve 50 is maintained relatively large. In this state, the amount of refrigerant gas sent from the discharge chamber 39 to the crank chamber 15 via the supply passage 48 exceeds the amount of refrigerant gas sent from the crank chamber 15 to the suction chamber 38 via the bleeding passage 46 and the communication hole 47. As a result, the crank pressure Pc increases such that the inclination of the swash plate 23 decreases. The discharge displacement of the compressor is thus decreased. However, when the passenger compartment temperature becomes close to the target temperature, the inclination of the swash plate 23 (the discharge displacement of the compressor) is automatically adjusted such that the cooling performance of the air-conditioning system corresponds to the difference between the detected passenger compartment temperature and the target temperature.

As the passenger compartment temperature becomes closer to the target temperature, the temperature of the evaporator 73 falls toward a frost generating temperature. However, if the temperature of the evaporator 73 is lower than a warning level, or the temperature at which frosting may occur, the controller 80 stops the current supply to the solenoid coil 69. The swash plate 23 is thus moved toward the minimum inclination angle. That is, since no current is supplied to the solenoid coil 69, no electromagnetic attractive force acts between the core 64 and the plunger 67. Accordingly, as shown in FIG. 2, the valve body 54 is urged by the valve spring 56 to move toward its fully open position. The opening of the control valve 50 thus becomes maximum, and the amount of refrigerant gas sent from the discharge chamber 39 to the crank chamber 15 via the supply passage 48 increases. The crank pressure Pc thus increases such that the inclination of the swash plate 23 (or the discharge displacement of the compressor) is minimized. Furthermore, the controller 80 also stops the current supply to the solenoid coil 69 in order to minimize the discharge displacement of the compressor when the switch 84 is turned off.

As described above, a feedback control is executed for altering the inclination of the swash plate 23 by adjusting the opening of the control valve 50 based on the external and internal control of the valve 50 such that the suction pressure Ps becomes closer to the target suction pressure Pset.

Furthermore, when the swash plate 23 is inclined at the minimum angle, the shutter surface 34 of the sleeve 28 abuts against the positioning surface 33. The suction passage 32 is thus disconnected from the shutter chamber 27 and the suction chamber 38. In this manner, the refrigerant gas in the external cooling circuit 70 is no longer supplied to the suction chamber 38, thereby completely stopping the operation of the air-conditioning system. However, in this state, since the minimum inclination angle is not zero degrees, the pistons 36 are reciprocated by a minimum stroke. Thus, the discharging of the refrigerant gas in the cylinder bores 12a to the discharge chamber 39 is maintained, though by a small amount. The refrigerant gas sent to the discharge chamber 39 flows in the supply passage 48 (and the control valve 50) and then enters the crank chamber 15. The gas in the crank chamber 15 passes through the bleeding passage 46 and then the communication hole 47, thus entering the suction chamber 38. The gas in the suction chamber 38 is introduced in the cylinder bores 12a and compressed in the bores 12a. The compressed refrigerant gas is returned to the discharge chamber 39. Specifically, as described above, the suction passage 32 is blocked by the sleeve 28 such that refrigerant gas defines an internal circulation path within the compressor. As long as discharge of the gas is maintained even by a small amount, the pressure differences among the discharge chamber 39, the crank chamber 15, and the suction chamber 38 are ensured. The pressure differences enable the refrigerant gas in the compressor to circulate along the above internal path. Meanwhile, lubricant oil is circulated in the compressor together with refrigerant gas. The compressor is thus reliably lubricated even when the discharge displacement of the compressor is minimized.

Figure 4:
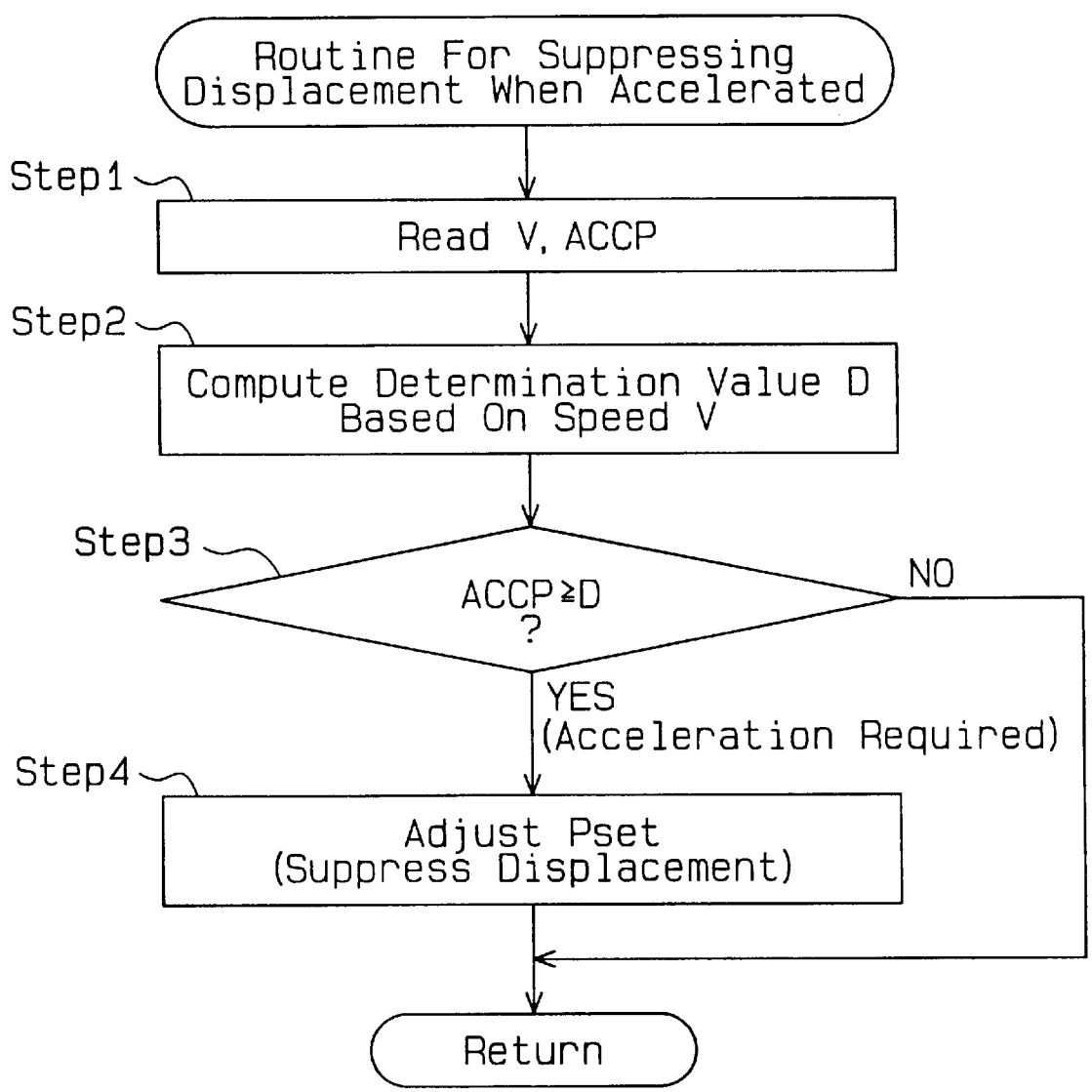
FIG. 4 is a flowchart diagrammatically showing a routine for suppressing the compressor discharge displacement when the automobile is accelerated according to the present invention.

FIG. 4 shows a flowchart of a control process for suppressing the compressor's discharge displacement (cooling performance) when the automobile is accelerated. The process is an interrupt routine that is executed periodically (for example, at every tens to hundreds of milliseconds) by the A/C controller 80.

When the process shown in FIG. 4 is started, the controller 80 performs Step 1 and reads the automobile's traveling speed V and the position of the accelerator ACCP. Next, the controller 80 executes Step 2 and computes the reference value D of the accelerator position from the speed V referring to the map shown in FIG. 5. Subsequently, the controller 80 executes Step 3, or compares the current accelerator position ACCP with the reference value D. If the current accelerator position ACCP is equal to or greater than the reference value D (judged as YES), the controller 80 performs Step 4. However, if the current accelerator position ACCP is smaller than the reference value D (judged as NO), the controller 80 terminates the routine as shown in FIG. 4.

In Step 3, if the current accelerator position ACCP is equal to or greater than the current reference value D, it is determined that the acceleration pedal 89 has been depressed by a relatively large amount such that the automobile is accelerating by a relatively large amount. In this case, the controller 80 performs Step 4, or decreases the current supply to the solenoid coil 69, thus raising the target suction pressure Pset of the control valve 50. The opening of the control valve 50 is thus maintained, even if the suction pressure Ps applied to the pressure chamber 58 is increased due to a larger difference between the detected passenger compartment temperature and the target temperature. That is, the raised target suction pressure Pset maintains the control valve 50 in its open state. This procedure increases the amount of refrigerant gas sent from the discharge chamber 39 to the crank chamber 15 through the supply passage 48. The crank pressure Pc is thus increased, and the compressor's discharge displacement decreases. In this state, the current supply to the solenoid coil 69 is maintained, and the swash plate 23 is prevented from inclining at the minimum angle. As a result, the sleeve 28 does not completely block the suction passage 32. The cooling of the air-conditioning system is thus reduced but not stopped.

As described above, when the position ACCP of the acceleration pedal 89 is equal to or greater than the current reference value D, the controller 80 raises the target suction pressure Pset of the control valve 50. In this manner, the compressor's discharge displacement is reduced, thus suppressing the cooling performance of the air-conditioning system. Specifically, when the acceleration of the automobile is started, the load applied by the compressor to the engine 20 is immediately reduced. Accordingly, the power of the engine 20 is available for accelerating the automobile, thus allowing the automobile to be smoothly accelerated.

Furthermore, even when the acceleration pedal 89 is depressed by a large amount, the operation of the air-conditioning system is continued. That is, the cooling performance of the system is reduced such that the acceleration is not hampered. In this manner, the automobile is smoothly accelerated while the passenger compartment continues to be air-conditioned.

It is particularly advantageous for automobiles having smaller displacement engines (for example, low displacement light cars) to be capable of smooth acceleration while the passenger compartment remains air-conditioned. For example, when traveling up a sloped road surface, the transmission is shifted down in order to increase the engine speed. In this case, the accelerator must be continuously pressed down by a great degree in order to maintain a constant traveling speed. As described above, if the position of the accelerator becomes equal to or greater than a constant reference value D, the prior art air-conditioning system is de-activated regardless of the traveling speed. Thus, the passenger compartment cannot be air-conditioned while climbing a sloped road surface. However, in the present invention, the reference value D is altered in relation to the traveling speed V as indicated by the line of FIG. 5. Accordingly, the automobile can be accelerated smoothly while the passenger compartment continues to be air-conditioned.

As shown in FIG. 5, the reference value D increases in proportion to the speed V in the first embodiment. The graph of FIG. 5 reflects to an accurate relationship between a desired acceleration amount and the actual corresponding position of the acceleration pedal 89. Specifically, the position of the acceleration pedal 89 is normally determined according to an equilibrium between the engine torque and the automobile's resistance (including resistance against rolling friction and air resistance). Thus, if the automobile travels at a constant speed, the position, or the opening, of the accelerator becomes greater as the speed becomes higher. Thus, the desired acceleration amount is not determined as a function of the absolute position of the accelerator but as a function of the variation in the accelerator position in a short time period. As described above, the reference value D remains constant regardless of the traveling speed V in the prior art. In this case, a control procedure for reducing the load applied by the compressor to the engine is executed only when the speed V is close to the assumed speed based on which the reference value D is selected. That is, when the speed V is greater than this assumed speed, the compressor is stopped even if no acceleration is desired. However, in the present invention, the reference value D increases as the traveling speed V increases. Thus, the desired acceleration amount is accurately determined from the current accelerator position.

Although only one embodiment of the present invention has been described so far, it should be apparent to those skilled in the art that the present invention may be embodied in many other specific forms without departing from the spirit or scope of the invention. In particular, alternate embodiments are described below.

An electromagnetic clutch mechanism may be provided between the compressor and the engine 20, which serves as the external drive source. In this case, when the automobile is accelerated, disconnection of the clutch mechanism for decreasing the load applied by the compressor to the engine is not performed.

Although the illustrated embodiment includes the sleeve 28 provided in the variable displacement compressor, a variable displacement compressor having no such mechanism for blocking the suction passage may be used. That is, the compressor need not include a mechanism for positively disconnecting the compressor from an external refrigerant circuit. In this case, if the position ACCP is equal to or greater than the reference value D, the controller 80 may execute a control procedure such that the discharge displacement becomes minimum in Step 3 of FIG. 4.

In the illustrated embodiment, the crank pressure Pc of the compressor adjusts the opening of the supply passage 48. Instead, an externally controllable displacement control valve may be provided in the bleeding passage.

Figure 6:
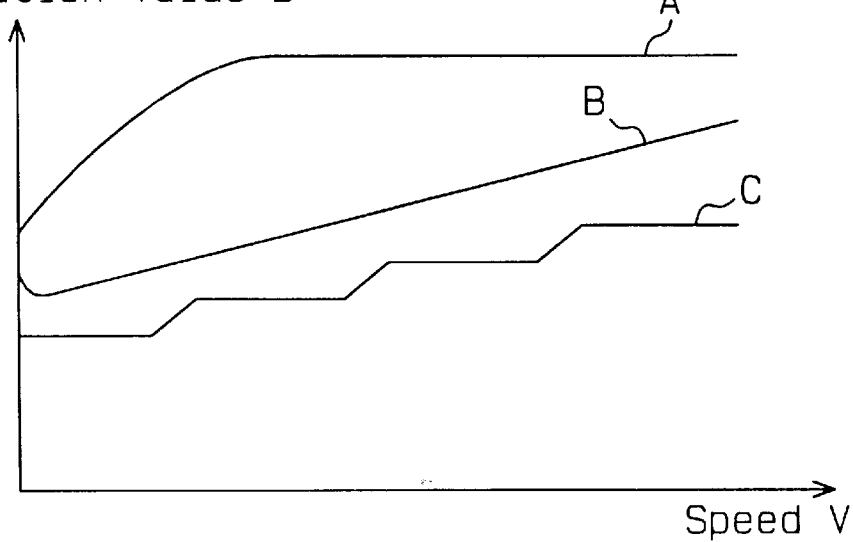
FIG. 6 is a graph showing the relationship between the traveling speed and the reference value of the accelerator operation amount in alternate embodiments of the present invention.

The relationship between the reference value D and the traveling speed V based on which the value D is computed is not restricted to the one indicated by the line of FIG. 5. As shown in FIG. 6, one of the relationships indicated by the lines A, B or C may be employed, as long as the reference value D becomes greater as the speed becomes higher.

Therefore, the present examples and embodiments are to be considered as illustrative and not restrictive and the invention is not to be limited to the details given herein, but may be modified within the scope of the appended claims.

What is claimed is:

1. An air conditioning apparatus having a first sensor for detecting the position of an accelerator, the accelerator position being defined by the degree of the depression of the accelerator, and a compressor driven by an engine of a vehicle, wherein a displacement of the compressor is varied by an external controller, said apparatus comprising:

a second sensor for detecting the vehicle speed;

computing means for computing a reference value of the accelerator position based on the vehicle speed, said reference value being used to determine that load applied to the engine by the compressor is to be decreased;

control means for controlling the compressor so as to decrease its displacement based on the reference value such that the compressor remains engaged with the engine to continue air-conditioning to the vehicle while the vehicle maintains acceleration; and said compressor having a crank chamber, a swash plate disposed in the crank chamber, and a valve for controlling pressure within the crank chamber, wherein said swash plate inclines at a variable inclination angle according to a change of pressure of the crank chamber to alter the displacement of the compressor, and wherein said valve changes the pressure of the crank chamber based on the current relationship between the accelerator position and the reference value.

2. An apparatus as set forth in claim 1, further comprising a memory for storing a map representing a relation between the reference value and the vehicle speed such that the reference value increases if the vehicle speed increases.

3. An apparatus as set forth in claim 1, wherein said valve is open to the position based on the difference between a target suction pressure and an actual suction pressure.

4. An apparatus as set forth in claim 3, wherein said valve is actuated by the control means with an electric current, the level of which is based on the reference value.

5. An apparatus as set forth in claim 1, wherein said first sensor includes a sensor for detecting the position of a throttle valve indicative of the degree of depression of the accelerator.

6. An air conditioning apparatus having a first sensor for detecting the position of an accelerator, said position being defined by the degree of the depression of the accelerator, and a compressor driven by an engine of a vehicle, wherein a displacement of the compressor is varied by an external controller, said apparatus comprising:

a second sensor for detecting the vehicle speed;

computing means for computing a reference value of the position of the accelerator, said reference value being used to determine that load applied to the engine by the compressor is needed to be decreased; wherein said reference value increases in association with an increase of the vehicle speed; and said compressor having a mechanism for altering the displacement of the compressor and actuating means for actuating the mechanism so as to decrease the displacement of the compressor based on the reference value such that the compressor remains engaged with the engine to continue air-conditioning to the vehicle while the vehicle maintains acceleration; said compressor having a crank chamber, a swash plate disposed in the crank chamber, and a valve for controlling pressure within the crank chamber, wherein said swash plate inclines at a variable inclination angle according to a change of pressure of the crank chamber to alter the displacement of the compressor, and wherein said valve changes the pressure of the crank chamber based on the current relationship between the accelerator position and the reference value.

7. An apparatus as set forth in claim 6, wherein said computing means includes a memory for storing a map for computing the reference value.

8. An apparatus as set forth in claim 6, wherein said valve is open to the position based on the difference between a target suction pressure and an actual suction pressure.

9. An apparatus as set forth in claim 8, wherein said valve is electromagnetically actuated by the control means with an electric current, the level of which is based on the reference value.

10. An apparatus as set forth in claim 6, wherein said first sensor includes a sensor for detecting an angle of a throttle valve indicative of the degree of the depression of the accelerator.

11. A method for controlling air conditioning apparatus having a compressor actuated by an engine of a vehicle, the compressor also having a crank chamber, a swash plate disposed in the crank chamber, and a valve for controlling pressure within the crank chamber, wherein said swash plate inclines at a variable inclination angle according to a change of pressure of the crank chamber to alter the displacement of the compressor, wherein a displacement of the compressor is varied by an external controller, said method comprising the steps of:

computing a reference value of a position of an accelerator;

determining whether a predetermined load is applied to the engine based on the vehicle speed and the position of the accelerator;

decreasing the displacement of the compressor after the determining step, wherein the valve changes the pressure of the crank chamber based on the current relationship between the accelerator position and the reference value; and maintaining acceleration of the vehicle while the vehicle continues to be air conditioned and the compressor remains engaged with the engine.

12. The method as set forth in claim 11, further including a step of varying the reference value of the accelerator position to decrease the engine load.

* * * * *